US010140853B2

(12) United States Patent
Chen

(10) Patent No.: US 10,140,853 B2
(45) Date of Patent: Nov. 27, 2018

(54) HOUSEHOLD APPLIANCES INFRARED REMOTE WAVEFORM REPLICATION LEARNING METHOD AND SYSTEM

(71) Applicant: Phicomm (Shanghai) Co., Ltd., Shanghai (CN)

(72) Inventor: Lei Chen, Shanghai (CN)

(73) Assignee: Phicomm (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 15/580,680

(22) PCT Filed: Nov. 20, 2015

(86) PCT No.: PCT/CN2015/095171
§ 371 (c)(1),
(2) Date: Dec. 7, 2017

(87) PCT Pub. No.: WO2017/016107
PCT Pub. Date: Feb. 2, 2017

(65) Prior Publication Data
US 2018/0190107 A1 Jul. 5, 2018

(30) Foreign Application Priority Data
Jul. 29, 2015 (CN) .......................... 2015 1 0456459

(51) Int. Cl.
*H04L 17/02* (2006.01)
*G08C 23/04* (2006.01)
*G08C 19/28* (2006.01)
*H05B 37/02* (2006.01)

(52) U.S. Cl.
CPC ............ *G08C 23/04* (2013.01); *G08C 19/28* (2013.01); *G08C 2201/20* (2013.01); *G08C 2201/92* (2013.01); *H05B 37/0272* (2013.01)

(58) Field of Classification Search
CPC ................................ G05B 15/02; F24F 11/30
USPC ........................................................ 341/176
See application file for complete search history.

(56) References Cited

U.S. PATENT DOCUMENTS 9,159,217 B1 * 10/2015 Logan .................. G05B 19/042
2010/0286801 A1 * 11/2010 Yum .................. H04L 12/2809 700/90
2013/0106587 A1 * 5/2013 Reams .................. G05B 15/02 340/12.52

* cited by examiner

*Primary Examiner* — Fabricio R Murillo Garcia
(74) *Attorney, Agent, or Firm* — Winston Hsu

(57) ABSTRACT

The present disclosure provides a method for replication and learning of a waveform for infrared (IR) remote control of a household appliance. The method includes: sampling a data code in a household appliance infrared remote waveform by a direct sampling method, so as to obtain sampled data; performing feature extraction on the sampled data to obtain a feature value; reversing the level whose length is shorter than the minimum feature value and is within a preset range; adding the reversed level length with the adjacent levels length to perform deburring in the household appliance infrared remote waveform, wherein adjacent levels refer to the levels previous and after the reversed level, and the minimum feature value is feature value of the minimum level length.

10 Claims, 6 Drawing Sheets

HOUSEHOLD APPLIANCES INFRARED REMOTE WAVEFORM REPLICATION LEARNING METHOD AND SYSTEM

CROSS-REFERENCE TO RELATED APPLICATIONS

The present application is an US national stage application of the international patent application PCT/CN2015/095171, filed on Nov. 20, 2015, which is based upon and claims priority of Chinese patent application serial No. 201510456459.7, filed on Jul. 29, 2015 and entitled "Household Appliances Infrared Remote Waveform Replication Learning Method and System", the entire contents of which are incorporated herein by reference.

TECHNICAL FIELD

The present disclosure relates to the field of signal processing and, in particular, to a method and system for replication and learning of a waveform for infrared (IR) remote control of a household appliance.

BACKGROUND

Nowadays, the smart home market is in full swing, and the popularity of this market is remarkably attributed to control of household appliances such as television (TV) sets and air conditioners by mobile phones. For this reason, smart home manufacturers need to replicate traditional remote controls for such household appliances like TV sets and air conditioners in order to allow remote or local control.

However, existing controllers available at the marketplace from these manufacturers usually are equipped with WiFi, ZigBee or other wireless communication modules which significantly differ from the traditional remote controls in terms of circuit structure and have much more complex internal electromagnetic environments. Sampling of IR waveforms for traditional remote controls always suffers from many interference levels which may lead to failure in replication of such waveforms by controller MCUs and hence in control of the household appliances.

Remote control codes for TV sets are relatively simple and with relatively open protocols. Therefore, interference with such codes can be circumvented by software approaches using known IR control protocols. However, the replication of control waveforms for air conditioners has been a challenge in this industry, because their lengths are much longer than those of waveforms for remote control TV sets and different air conditioner manufacturers would use their own unique waveform structures for control. All conventional smart home controllers employ an I/O interface of the MCU for all sampling operations. As a result, the interference levels cannot be removed, leading to a very low success rate of waveform learning and seriously affecting the development progress and subsequent user experience.

Existing methods for interference removal are simple and crude, and they cannot accurately locate abnormal levels. That is, they cannot identify which level is abnormal or which level with short length is abnormal. They can only identify burred levels that are substantially consistent with normal levels as interference and apply manual interventions thereto. In addition, when a lot of burred levels occur, the method will be unable to identify and correct the abnormal levels.

At present, most manufacturers adopt transmission methods for low-rate wireless transmission, such as those based on ZigBee, BT and the like. However, remote controls for Japanese air conditioners usually use very long remote control codes, typically of 500 MS or more. Obviously, the low-rate transmission protocols used in the conventional sampling methods are incapable of transmitting such codes.

SUMMARY

Embodiments of the present disclosure provide a method and system for replication and learning of a waveform for infrared (IR) remote control of a household appliance so as to resolve the problem that the conventional replication techniques can only replicate remote control signals for TV sets that are encoded in a simple way but cannot successfully replicate complicatedly-encoded remote control signals for air conditioners.

In order to achieve the above and other related objects, the present disclosure provides a method for replication and learning of a waveform for IR remote control of a household appliance, including: sampling a data code in a household appliance infrared remote waveform by a direct sampling method so as to obtain sampled data, the sampled data structure includes a level type and a level duration, the level type includes high level and low level; performing feature extraction on the sampled data to obtain a feature value, the feature value comprises a high level feature value and a low level feature value, the feature value comprising a level value and a level length, wherein the level length is the level duration, the level value is 1 or 0; and reversing the level whose length is shorter than the minimum feature value and is within a preset range; adding the reversed level length with the adjacent levels length to perform deburring in the household appliance infrared remote waveform, wherein the adjacent levels refer to the levels previous and after the reversed level, and the minimum feature value is feature value of the minimum level length. Optionally, performing the feature extraction on the sampled data so as to obtain the feature values includes: classifying the sampled data with high level type as sampled high level data; and processing the level durations of the sampled high level data, the processing including: deleting a first preset number of the sampled high level data with the longest durations and a second preset number of the sampled high level data with the shortest durations; dividing the remaining sampled high level data into four groups with the same time interval; selecting a level duration average value of a data group with maximum volume from the four high level sampled data groups as a first feature value t4 of the sampled high level data; and selecting a level duration average value of a data group with second largest volume from the four high level sampled data groups as a second feature value t2 of the sampled high level data. Optionally, performing the feature extraction on the sampled data so as to obtain the feature values includes: classifying the sampled data with low level type as sampled low level data; and processing the level durations of the sampled low level data, the processing, the processing including: deleting a first preset number of the sampled low level data with the longest durations and a second preset number of the sampled low level data with the shortest durations; dividing the remaining sampled low level data into four groups with the same time interval; selecting a level duration average value of a data group with maximum volume from the four low level sampled data groups as a first feature value t3 of the sampled low level data; and selecting a level duration average value of a data group with second largest volume from the four low level sampled data groups as a second feature value t1 of the sampled low level data.

Optionally, the method for replication and learning of a waveform for IR remote control of a household appliance further includes: encoding the sampled data, the method for encoding the sampled data includes: comparing the sampled high level data with the first feature value t4 and second feature value t2 of the sampled high level data and assigning the sampled high level data whose level length is within 50% of the feature values with the corresponding feature value; and comparing the sampled low data with the first feature value t3 and second feature value t1 of the sampled low level data, and, assigning the sampled low level data whose level length is within 50% of the feature values with the corresponding feature value; so that the assigned sampled level data become the data represented by the four feature values t1, t2, t3 and t4. Optionally, the compression-encoding further includes: representing the four feature values t1, t2, t3 and t4 with the binary numbers "00", "01", "10" and "11", respectively, so that the sampled data are represented by the four binary numbers "00", "01", "10" and "11".

The present disclosure also provides a system for replication and learning of a waveform for IR remote control of a household appliance, including: a sampling module, configured to sample a data code from the household appliance infrared remote waveform by a direct sampling method so as to obtain the sampled data; the sampled data structure comprises a level type and a level duration, the level type comprises a high level and a low level; a feature extraction module connected to the sampling module, configured to perform the feature extraction to the sampled data to obtain a feature value, the feature value comprising high level feature values and low level feature values; each the feature value comprising a level value and a level length, wherein the level length is the level duration, and the level value is 1 or 0; and a deburring module connected to the feature extraction module and the sampling module, configured to reverse the level whose length is shorter than the minimum feature value and is within a preset range, and adding the reversed level length with the adjacent levels length to perform deburring in the household appliance infrared remote waveform, wherein the adjacent levels refer to the levels previous and after the reversed level, and the minimum feature value is the feature value of the minimum level length. Optionally, the feature extraction module includes: a classifying unit, configured to classify the sampled data with the high level type as high level sampled data; and a first processing unit connected to the classifying unit, configured to process the level durations of the sampled high level data, the first processing unit including: a first deleting subunit connected to the classifying unit, configured to delete a first preset number of the sampled high level data with the longest durations and a second preset number of the sampled high level data with the shortest durations; a first dividing subunit connected to the first deleting subunit and the classifying unit, configured to divide the remaining sampled high level data into four groups with the same time interval; a first feature value extraction subunit connected to the first dividing subunit, configured to select a level duration average value of a data group with maximum volume from the four high level sampled data groups as a first feature value t4 of the sampled high level data; and a second feature value extraction subunit connected to the first dividing subunit, configured to select a level duration average value of a data group with second largest volume from the four high level sampled data groups as a second feature value t2 of the sampled high level data.

Optionally, the feature extraction module further includes: the classifying unit, configured to classify the sampled data with the low level type as low level sampled data; and a second processing unit connected to the classifying unit, configured to process the level durations of the sampled low level data, the second processing unit including: a second deleting subunit connected to the classifying unit, configured to delete a first preset number of the sampled low level data with the longest durations and a second preset number of the sampled low level data with the shortest durations; a second classifying subunit connected to the first deleting subunit and the classifying unit, configured to divide the remaining sampled low level data into four groups with the same time interval; a third feature value extraction subunit connected to the first classifying subunit, configured to select a level duration average value of a data group with largest volume from the four low level sampled data groups as a first feature value t3 of the sampled low level data; and a fourth feature value extraction subunit connected to the first classifying subunit, configured to select a level duration average value of a data group with second largest volume from the four low level sampled data groups as a second feature value t1 of the sampled low level data.

Optionally, the system for replication and learning of a waveform for IR remote control of a household appliance further includes an encoding module connected to the feature extraction module, the encoding module including: a high level assigning unit, configured to compare the sampled high level data with the first feature value t4 and second feature value t2 of the sampled high level data and assign the sampled high level data whose level length is within 50% of the feature values with the corresponding high level feature value; a low level assigning unit, configured to compare the sampled low level data with the first feature value t3 and second feature value t1 of the sampled low level data and assign the sampled low level data whose level length is within 50% of the feature values with the corresponding low level feature value; and a representing unit, configured to represent the assigned level data with four feature values t1, t2, t3, and t4.

Optionally, the encoding module further includes: a binary representing unit connected to the representing unit, configured to respectively represent the four feature values t1, t2, t3 and t4 with the binary numbers "00", "01", "10" and "11", so that the sampled data are encoded with the four binary numbers "00", "01", "10", and "11".

As mentioned above, the method and system for replication and learning of a waveform for IR remote control of a household appliance of the present disclosure show the following benefits:

According to the present disclosure, based on an in-depth analysis on waveforms of remote control codes for air conditioners, a statistical method is used to determine feature values of a remote control code for an air conditioner and solve the burrs interference. In addition, compression of the very long remote control code by a considerable proportion results in a significant increase in the success rate of replication of the IR remote control code.

DESCRIPTION OF REFERENCE NUMERALS OF ELEMENTS

Figure 1A:
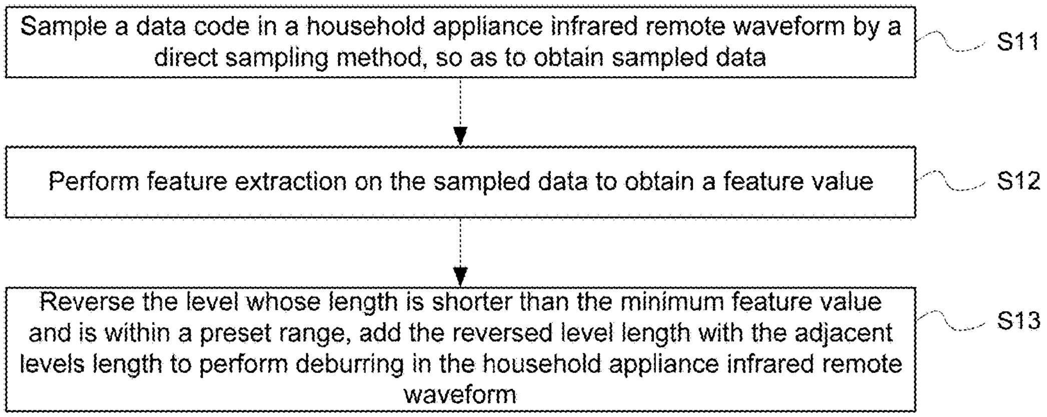
FIG. 1*a* is a flowchart illustrating an implementation of a method for replication and learning of a waveform for infrared (IR) remote control of a household appliance according to an embodiment of the present disclosure.

100 System for replication and learning of a waveform for IR remote control of a household appliance
110 Sampling module
120 Feature extraction module
121 Classifying unit
122 First processing unit
1221 First deleting subunit
1222 First classifying subunit
1223 First feature value extraction subunit
1224 Second feature value extraction subunit
123 Second processing unit
1231 Second deleting subunit
1232 Second classifying subunit
1233 Third feature value extraction subunit
1234 Fourth feature value extraction subunit
130 Deburring module
140 Encoding module
141 High level assigning unit
142 Low level assigning unit
143 Representing unit
S11~S13 Steps
S21~S22 Steps
S221~S224 Steps
S31~S32 Steps
S321~S324 Steps
S41~S42 Steps

DETAILED DESCRIPTION

The present disclosure will be described below by means of specific embodiments. Other advantages and effects of the disclosure will be readily understood by those skilled in the art from the disclosure herein. The present disclosure may also be implemented or utilized as other different specific embodiments, and various modifications or changes may be made to the details disclosed herein from different views and for different applications without departing from the spirit of the disclosure. It is noted that in case of no conflict the following embodiments and the features in the embodiments may be combined with one another.

It is noted that the drawings presented in the following embodiments are intended merely to illustrate the basic concept of the present disclosure in a schematic manner and hence only show the components related hereto which are not drawn to their quantities, shapes and sizes in actual implementations where their configurations, quantities and scales may vary arbitrarily and their arrangements may also be more complex.

Figure 1B:
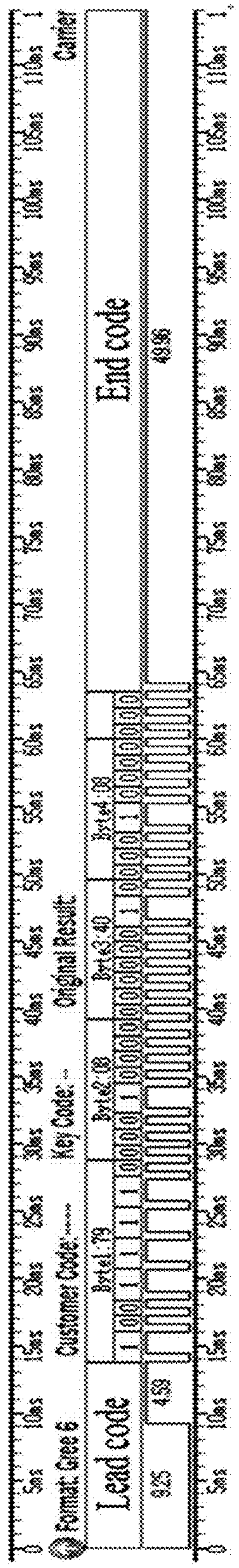
FIG. 1*b* is a schematic illustration of a waveform of a remote control signal for an air conditioner.
Figure 1C:
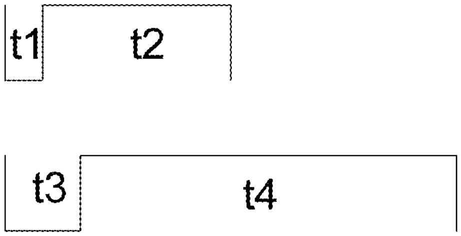
FIG. 1*c* is a diagram schematically illustrating signal elements of a data code according to an embodiment of the present disclosure.

Referring to FIG. 1*a*, the present disclosure provides a method for replication and learning of a waveform for infrared (IR) remote control of a household appliance. The method for replication and learning of a waveform for IR remote control of a household appliance includes: S11: sampling a data code from the household appliance infrared remote waveform by a direct sampling method so as to obtain the sampled data. The sampled data have a structure including a level type and a level duration, wherein the level type includes high level and low level. For example, as shown in FIG. 1*b*, a diagram shows a waveform of a remote control signal for an air conditioner, a conventional remote control code for an air conditioner is generally composed of a boot code, a data code and an end code. The boot and end codes are special and are not discussed herein. The data code typically consists of two signal types as shown in FIG. 1*c*. The low level duration of the first type is set as t1 and the high level duration is set as t2, and the low level duration of the second type is set as t3 and a high level duration is set as t4, wherein t4 is greater than t2 and t3 is greater than t1. Each datum in the data code may be structured as including a first bit representing whether the level is a high or low level and the following bit indicating a length thereof. This approach is the so-called direct sampling method with a high data capacity. Table 1 presents part of data sampled from a remote control signal for a Gree air conditioner, wherein H's denote high levels, L's represent low levels and the numbers are their durations measured in milliseconds.

TABLE 1

| Sampled Data | |
|---|---|
| L | 3523.9 |
| H | 1717.7 |
| L | 455.9 |
| H | 431.7 |
| L | 434.1 |
| H | 1293.5 |
| L | 434.2 |
| H | 431.7 |
| L | 434 |
| H | 431.8 |
| L | 434 |
| H | 431.7 |
| L | 438.3 |

S12: performing the feature extraction on the sampled data to obtain feature values. The feature values include high level feature values and low level feature values. Each feature value includes a level value and a level length. The level length refers to its duration, and the value of the level is either 1 or 0. The feature value of the sampled data may contain various variants such as averages, maximums or minimums of level lengths.

S13: reversing the level whose length is shorter than the minimum feature value and is within a preset range, and adding the reversed level length with the adjacent levels length to perform deburring in the household appliance infrared remote waveform. The adjacent levels refer to the levels previous and after the reversed level, and the minimum feature value is feature value of the minimum level length. The minimum feature value is feature value of the minimum level length. Here, reversing of a level refers to set an original high level to a low level or an original low level to a low level. For example, the preset range may be a percentage range determined according the practical need, e.g., 50%, 30% or the like. In other words, this step is carried out to compare the originally sampled data with the feature values and thereby delete or filter those original data that excessively deviated from the feature values, i.e., correcting possible interference levels therein, so as to remove burrs from the IR wave for the household appliance.

Figure 2A:
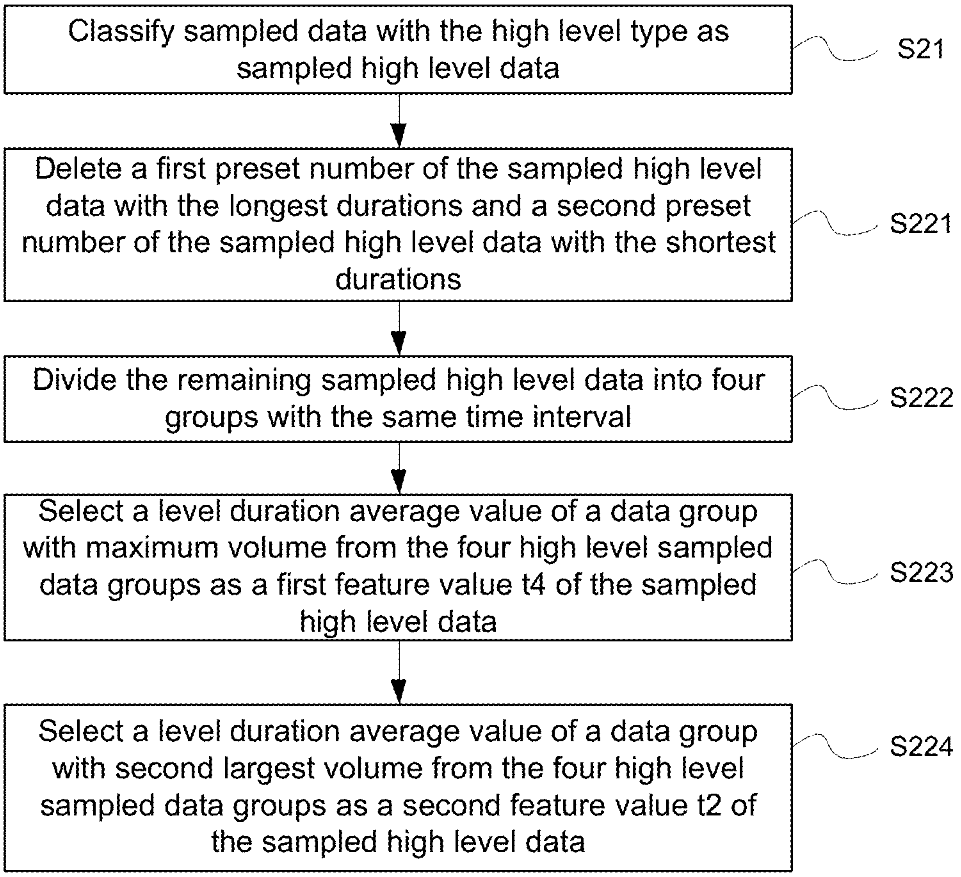
FIG. 2*a* is a flowchart graphically illustrating a high level implementation of step S12 in the method for replication and learning of a waveform for IR remote control of a household appliance according to an embodiment of the present disclosure.

In addition, referring to FIG. 2*a*, in step S12, an implementation of performing the feature extraction on the sampled data so as to obtain the feature values includes:

S21: classifying sampled data with the high level type as sampled high level data; S22: processing the level durations of the sampled high level data. The processing includes: S221: deleting a first preset number of the sampled high level data with the longest durations and a second preset number of the sampled high level data with the shortest durations. For example, 10 sampled high level data with the longest durations and 10 sampled high level data with the shortest durations are deleted.

Figure 3:
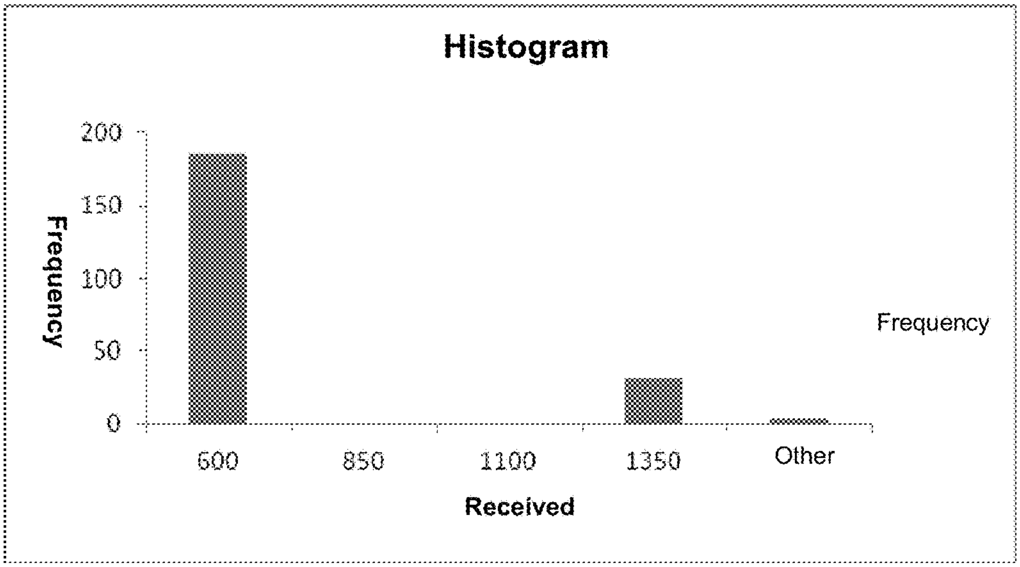
FIG. 3 schematically shows an analysis using a histogram according to an embodiment of the present disclosure.

S222: dividing the remaining sampled high level data into four groups with the same time interval. For example, an aggregate duration of the remaining sampled high level data is determined by subtracting the minimum from the maximum, of the durations of the remaining sampled high level data, and is divided into four segments. A histogram (referring to FIG. 3) is used to analyze frequency of the sampled high level data occurs in the respective segmental intervals and thereby determine the frequency of the remaining sampled high level data occurs in the respective segmental intervals.

S223: selecting a level duration average value of a data group with maximum volume from the four high level sampled data groups as a first feature value t4 of the sampled high level data. For example, the interval or time point of the highest frequency that the sampled data occur is set as the first feature value t4 of the sampled high level data.

Figure 2B:
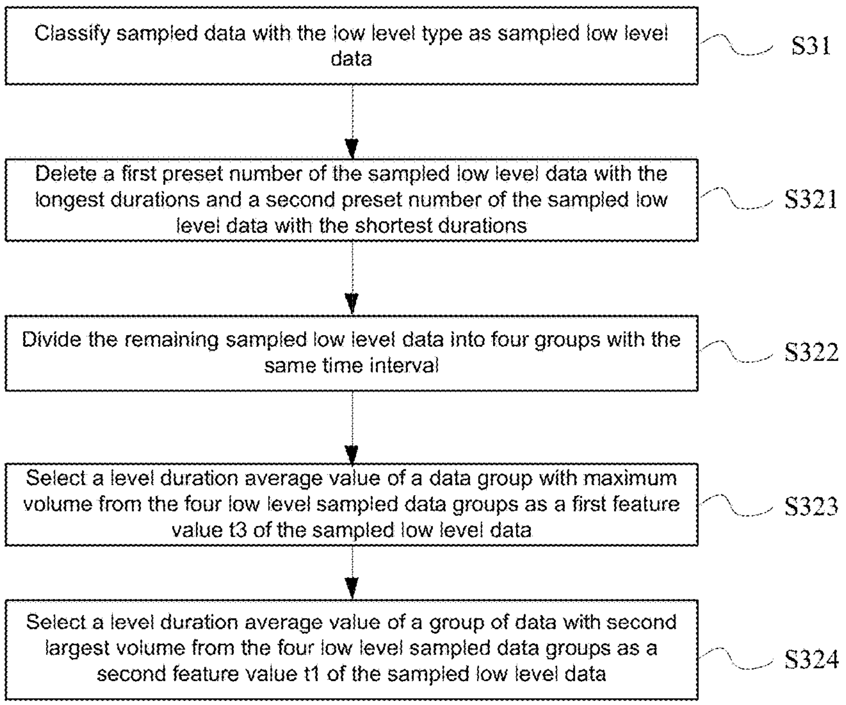
FIG. 2*b* is a flowchart graphically illustrating a low level implementation of step S12 in the method for replication and learning of a waveform for IR remote control of a household appliance according to an embodiment of the present disclosure.

S224: selecting a level duration average value of a data group with second largest volume from the four high level sampled data groups as a second feature value t2 of the sampled high level data. For example, the interval or time point of the second highest frequency that the sampled data occur is set as the second feature value t2 of the sampled high level data. Additionally, referring to FIG. 2*b*, the implementation of performing the feature extraction on the sampled data to obtain the feature values further includes:

S31: classifying sampled data with the low level type as sampled low level data;

S32: processing the level durations of the sampled low level data. The processing includes:

S321: deleting a first preset number of the sampled low level data with the longest durations and a second preset number of the sampled low level data with the shortest durations. For example, 10 sampled low level data with the longest durations and 10 sampled low level data with the shortest durations are deleted.

S322: dividing the remaining sampled low level data into four groups with the same time interval. For example, an aggregate duration of the remaining sampled low level data is determined by subtracting the minimum from the maximum, of the durations of the remaining sampled low level data, and is divided into four segments. A histogram (referring to FIG. 3) is used to analyze frequency of the sampled low level data occurs in the respective segmental intervals and thereby determine the frequency of the remaining sampled low level data occurs in the respective segmental intervals.

S323: selecting a level duration average value of a data group with maximum volume from the four low level sampled data groups as a first feature value t3 of the sampled low level data. For example, the interval or time point of the highest frequency that the sampled data occur is set as the first feature value t3 of the sampled low level data S324: selecting a level duration average value of a group of data with second largest volume from the four low level sampled data groups as a second feature value t1 of the sampled low level data. For example, the interval or time point of the second highest frequency that the sampled data occur is set as the second feature value t1 of the sampled low level data.

Figure 4:
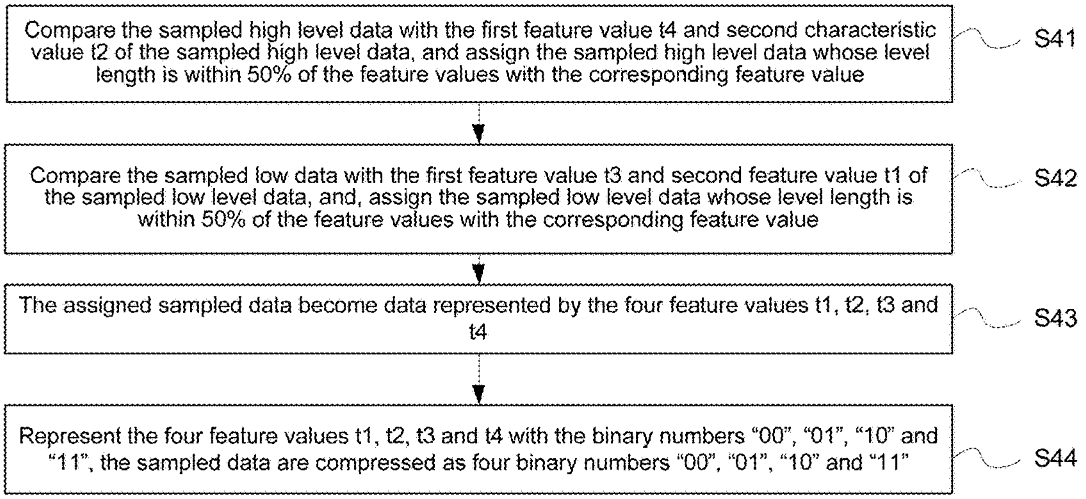
FIG. 4 is a flowchart illustrating another implementation of the method for replication and learning of a waveform for IR remote control of a household appliance according to an embodiment of the present disclosure.

Moreover, referring to FIG. 4, the method for replication and learning of a waveform for IR remote control of a household appliance further includes encoding the sampled data. A method for the compression-encoding includes:

S41: comparing the sampled high level data with the first feature value t4 and second characteristic value t2 of the sampled high level data, and assigning the sampled high level data whose level length is within 50% of the feature values with the corresponding feature value. For example, when t2=394.9 and t4=1234.7, assign an original sampled high level data with a level length of 1000.5 to 1234.7, and an original sampled high level data with a level length of 422.5 to 394.9.

S42: comparing the sampled low data with the first feature value t3 and second feature value t1 of the sampled low level data, and, assigning the sampled low level data whose level length is within 50% of the feature values with the corresponding feature value. For example, when t1=180.9 and t3=680.7, assign an original sampled low level data with a level length of 102.2 to 180.9, and an original sampled low level data with a level length of 542.2 to 680.7.

S43: As a result, the assigned sampled data become data represented by the four feature values t1, t2, t3 and t4.

S44: Representing the four feature values t1, t2, t3 and t4 with the binary numbers “00”, “01”, “10” and “11”, the sampled data are compressed as four binary numbers “00”, “01”, “10” and “11”. With this compression approach, the waveform in the form of data bits is directly compressed as being represented by the four binary numbers. During transmission of this waveform, a description of the feature value length is added to the packet header so that the receiver can directly extract the whole waveform. As for the start and end bits, in the present disclosure, the direct sampling method is used to directly add them to the whole packet.

According to the present disclosure, determination of the waveform feature values through statistical frequency histograms enables effective removal of burred levels and smooth recovery of the waveform. In addition, compression of the very long remote control waveform for the air conditioner by a considerable proportion results is a significant increase in the success rate of sampling.

The scope of protection of the method for replication and learning of a waveform for IR remote control of a household appliance disclosed herein is not limited to the order in which the steps are performed as described in this embodiment, all embodiments made through addition of or substitution for conventional steps based on the principles of the present disclosure are embraced in the scope of protection thereof.

The present disclosure also provides a system for replication and learning of a waveform for IR remote control of a household appliance. The system for replication and learning of a waveform for IR remote control of a household appliance can implement the method for replication and learning of a waveform for IR remote control of a household appliance disclosed herein. However, devices that can implement the method for replication and learning of a waveform for IR remote control of a household appliance disclosed herein include, but not limited to, the method for replication and learning of a waveform for IR remote control of a household appliance disclosed herein. Rather, all variations of or substitutions for conventional structures made based on the principles of the present disclosure are embraced in the scope of protection thereof.

Figure 5:
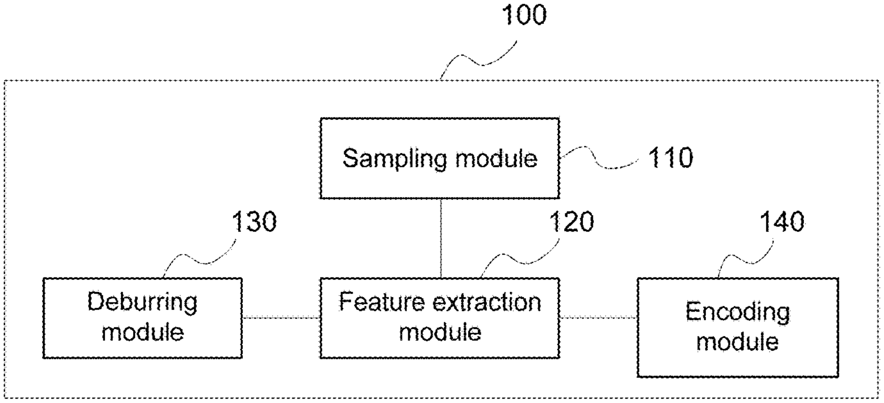
FIG. 5 is a structural schematic of an implementation of a system for replication and learning of a waveform for IR remote control of a household appliance according to an embodiment of the present disclosure.

Referring to FIG. 5, the system 100 for replication and learning of a waveform for IR remote control of a household appliance includes: a sampling module 110, a feature extraction module 120, a deburring module 130 and an encoding module 140. The sampling module 110 is configured to sample a data code from the household appliance infrared remote waveform by a direct sampling method so as to obtain the sampled data; the sampled data structure comprises a level type and a level duration, the level type comprises a high level and a low level. For example, as shown in FIG. 1*b*, a diagram showing a waveform of a remote control signal for an air conditioner, a conventional remote control code for an air conditioner is generally composed of a boot code, a data code and an end code. The lead and end codes are special and are not discussed herein. The data code typically consists of signal elements of two types as shown in FIG. 1*c*. The low level duration of the first type is set as t1 and the high level duration is set as t2, and the low level duration of the second type is set as t3 and a high level duration is set as t4, wherein t4 is greater than t2 and t3 is greater than t1. Each datum in the data code may be structured as including a first bit representing whether the level is a high or low level and the following bit indicating a length thereof. This approach is the so-called direct sampling method with a high data capacity. Table 1 presents part of data sampled from a remote control signal for a Gree air conditioner, wherein H's denote high levels, L's represent low levels and the numbers are their durations measured in milliseconds.

The feature extraction module 120 is connected to the sampling module 110 and is configured to perform the feature extraction to the sampled data to obtain a feature value, the feature value comprising high level feature values and low level feature values; each the feature value comprising a level value and a level length, wherein the level length is the level duration, and the level value is 1 or 0. The feature values of the sampled data may contain various variants such as averages, maximums or minimums of level lengths.

The deburring module 130 is connected to both the characteristic extraction module 120 and the sampling module 110 and is configured to reverse the level whose length is shorter than the minimum feature value and is within a preset range, and adding the reversed level length with the adjacent levels length to perform deburring in the household appliance infrared remote waveform, wherein the adjacent levels refer to the levels previous and after the reversed level, and the minimum feature value is the feature value of the minimum level length. The minimum feature value is the one with the minimum level length. In other words, in the present disclosure, the originally sampled data are compared with the feature values, thereby removing or filtering those original data that excessively deviated from the feature values, i.e., correcting possible interference levels therein, so as to remove burrs from the IR sound wave for the household appliance.

Figure 6:
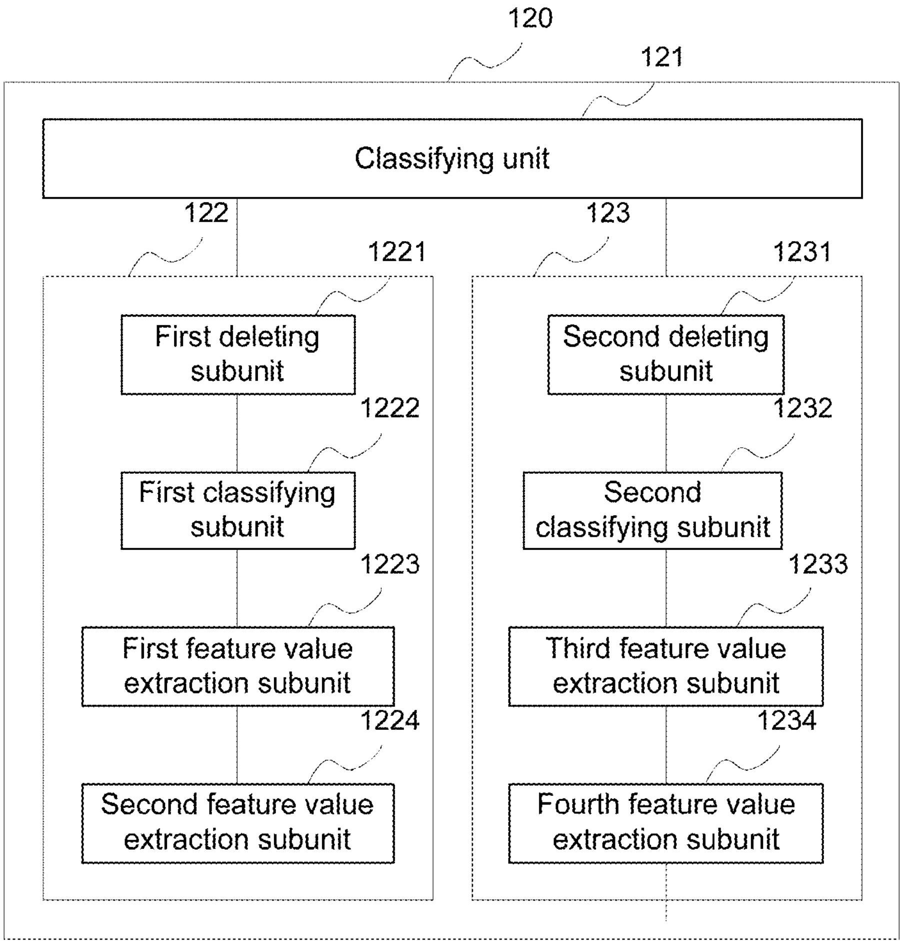
FIG. 6 is a structural schematic of another implementation of the system for replication and learning of a waveform for IR remote control of a household appliance according to an embodiment of the present disclosure.

Further, referring to FIG. 6, the feature extraction module 120 includes a classifying unit 121, a first processing unit 122 and a second processing unit 123.

The classifying unit 121 is configured to classify the sampled data with the high level type as high level sampled data.

The first processing unit 122 is connected to the classifying unit 121 and is configured to process the level durations of the sampled high level data.

The second processing unit 123 is connected to the classifying unit 121 and is configured to process the level durations of the sampled low level data.

The first processing unit 122 includes a first deleting subunit 1221, a first classifying subunit 1222, a first feature value extraction subunit 1223 and a second feature value extraction subunit 1224.

The first deleting subunit 1221 is connected to the classifying unit 121 and is configured to delete a first preset number of the sampled high level data with the longest durations and a second preset number of the sampled high level data with the shortest durations. For example, 10 sampled high level data with the longest durations and 10 sampled high level data with the shortest durations are deleted. The first classifying subunit 1222 is connected to the first deleting subunit and the classifying unit and is configured to divide the remaining sampled high level data into four groups with the same time interval. For example, an aggregate duration of the remaining sampled high level data is determined by subtracting the minimum from the maximum, of the durations of the remaining sampled high level data, and is divided into four segments. A histogram (referring to FIG. 3) is used to analyze frequency of the sampled high level data occurs in the respective segmental intervals and thereby determine the frequency of the remaining sampled high level data occurs in the respective segmental intervals. The first feature value extraction subunit 1223 is connected to the first classifying subunit and is configured to select a level duration average value of a data group with maximum volume from the four high level sampled data groups as a first feature value t4 of the sampled high level data. For example, the interval or time point of the highest frequency that the sampled data occur is set as the first feature value t4 of the sampled high level data. The second feature value extraction subunit 1224 is connected to the first classifying subunit and is configured to a level duration average value of a data group with second largest volume from the four high level sampled data groups as a second feature value t2 of the sampled high level data. For example, the interval or time point of the second highest frequency that the sampled data occur is set as the second feature value t2 of the sampled high level data.

The second processing unit 123 includes a second deleting subunit 1231, a second classifying subunit 1232, a third feature value extraction subunit 1233 and a fourth feature value extraction subunit 1234.

The second deleting subunit 1231 is connected to the classifying unit 121 and is configured to delete a first preset number of the sampled low level data with the longest durations and a second preset number of the sampled low level data with the shortest durations. For example, For example, 10 sampled low level data with the longest durations and 10 sampled low level data with the shortest durations are deleted. The second classifying subunit 1232 is connected to the first deleting subunit and the classifying unit and is configured to divide the remaining sampled low level data into four groups with the same time interval. For example, an aggregate duration of the remaining sampled low level data is determined by subtracting the minimum from the maximum, of the durations of the remaining sampled low level data, and is divided into four segments. A histogram (referring to FIG. 3) is used to analyze frequency of the sampled low level data occurs in the respective segmental intervals and thereby determine the frequency of the remaining sampled low level data occurs in the respective segmental intervals.

The third feature value extraction subunit 1233 is connected to the first classifying subunit and is configured to select a level duration average value of a data group with largest volume from the four low level sampled data groups as a first feature value t3 of the sampled low level data. For example, the interval or time point of the highest frequency that the sampled data occur is set as the first feature value t3 of the sampled low level data.

The fourth feature value extraction subunit 1234 is connected to the first feature subunit and is configured to select a level duration average value of a data group with the second largest volume from the four low level sampled data groups as a first feature value t1 of the sampled low level data. For example, the interval or time point of the second highest frequency that the sampled data occur is set as the first feature value t3 of the sampled low level data.

Figure 7:
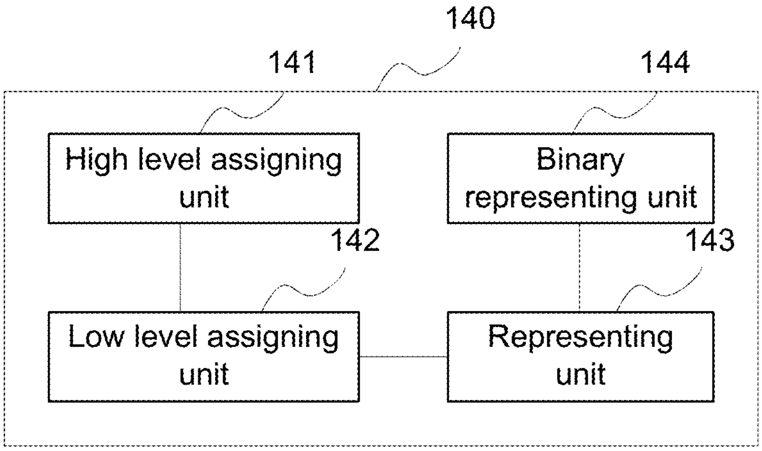
FIG. 7 is a structural schematic of a third implementation of the system for replication and learning of a waveform for IR remote control of a household appliance according to an embodiment of the present disclosure.

Further, referring to FIG. 7, the encoding module 140 is connected to the feature extraction module 120 and includes a high level assigning unit 141, a low level assigning unit 142, a representing unit 143 and a binary representing unit 144.

The high level normalization unit 141 in configured to compare the sampled high level data with the first feature value t4 and second feature value t2 of the sampled high level data and assign the sampled high level data whose level length is within 50% of the feature values with the corresponding high level feature value. For example, when t2=394.9 and t4=1234.7, assign an original sampled high level data with a level length of 1000.5 to 1234.7, and an original sampled high level data with a level length of 422.5 to 394.9.

The low level assigning unit 142 is configured to compare the sampled low data with the first feature value t3 and second feature value t1 of the sampled low level data, and, assigning the sampled low level data whose level length is within 50% of the feature values with the corresponding feature value. For example, when t1=180.9 and t3=680.7, assign an original sampled low level data with a level length of 102.2 to 180.9, and an original sampled low level data with a level length of 542.2 to 680.7.

The sampled data assigned by the representing unit 143 become data represented by the four feature values t1, t2, t3 and t4.

The binary representing unit 144 is connected to the representing unit and is configured to respectively represent the four feature values t1, t2, t3, and t4 with the binary numbers "00", "01", "10", and "11", so that the sampled data are encoded with the four binary numbers "00", "01", "10", and "11". With this compression approach, the waveform in the form of data bits is directly compressed as being represented by the four binary numbers. During transmission of this waveform, a description of the feature value length is added to the packet header so that the receiver can directly extract the whole waveform. As for the start and end bits, in the present disclosure, the direct sampling method is used to directly add them to the whole packet.

According to the present disclosure, based on an in-depth analysis on waveforms of remote control codes for air conditioners, a statistical method is used to determine feature values of a remote control code for an air conditioner. This addresses the problem of interference from burrs. In addition, compression of the very long remote control code by a considerable proportion results in a significant increase in the success rate of replication of the IR remote control code.

In summary, the present disclosure has effectively overcome the various drawbacks of the prior art and has a high value in industrial use.

The embodiments presented above merely explain the principles and effects of the present disclosure exemplarily and are not intended to limit the disclosure. Any person familiar with the art can make modifications or changes to the above embodiments without departing from the spirit and scope of the disclosure. Accordingly, all equivalent modifications or changes made by those of ordinary skill in the art without departing from the spirit and technical concept disclosed herein are intended to be embraced by the claims of the present disclosure.

What is claimed is:

1. A method for replication and learning of a waveform for infrared (IR) remote control of a household appliance, comprising:

sampling a data code in the household appliance infrared remote waveform by a direct sampling method to obtain sampled data, wherein the sampled data comprises a level type and a level duration, wherein the level type comprises a high level and a low level;

performing feature extraction on the sampled data to obtain a feature value, wherein the feature value comprises a high level feature value and a low level feature value, the feature value comprising a level value and a level length, wherein the level length is the level duration, the level value is selected between 1 and 0; and reversing the level length which is shorter than a minimum feature value and is within a preset range; adding the reversed level length with an adjacent levels length of adjacent levels to perform deburring in the household appliance infrared remote waveform, wherein the adjacent levels refer to the levels previous and after the reversed level, and the minimum feature value is a feature value with a minimum level length.

2. The method for replication and learning of the waveform for IR remote control of the household appliance according to claim 1, wherein performing feature extraction on the sampled data to obtain the feature value comprises:

classifying the sampled data with the high level type as sampled high level data; and processing the level duration of the sampled high level data, comprising:

deleting a first preset number of the sampled high level data with a longest duration and a second preset number of the sampled high level data with a shortest duration;

dividing a remaining sampled high level data into four groups with a same time interval;

selecting a level duration average value of a data group with maximum volume from the four high level sampled data groups as a first feature value t4 of the sampled high level data; and selecting a level duration average value of a data group with second largest volume from the four high level sampled data groups as a second feature value t2 of the sampled high level data.

3. The method for replication and learning of the waveform for IR remote control of the household appliance according to claim 2, wherein performing feature extraction on the sampled data to obtain the feature value comprises:

classifying the sampled data with the low level type as sampled low level data; and processing the level duration of the sampled low level data, comprising:

deleting a first preset number of the sampled low level data with a longest duration and a second preset number of the sampled low level data with a shortest duration;

dividing a remaining sampled low level data into four groups with a same time interval;

selecting a level duration average value of a data group with maximum volume from the four low level sampled data groups as a first feature value t3 of the sampled low level data; and selecting a level duration average value of a data group with second largest volume from the four low level sampled data groups as a second feature value t1 of the sampled low level data.

4. The method for replication and learning of the waveform for IR remote control of the household appliance according to claim 3, further comprising encoding the sampled data, wherein encoding the sampled data comprises:

comparing the sampled high level data with the first feature value t4 and the second feature value t2 of the sampled high level data and assigning the sampled high level data whose level length is within 50% of the first feature value t4 or the second feature value t2 with a corresponding feature value, the corresponding feature value being the first feature value t4 or the second feature value t2;

comparing the sampled low level data with the first feature value t3 and the second feature value t1 of the sampled low level data, and assigning the sampled low level data whose level length is within 50% of the first feature value t3 or the second feature value t1 with a corresponding feature value, the corresponding feature value being the first feature value t3 or the second feature value t1, so that the assigned sampled high level data and sampled low level data become the data represented by the four feature values t1, t2, t3 and t4.

5. The method for replication and learning of the waveform for IR remote control of the household appliance according to claim 4, wherein the encoding method further comprises:

representing the four feature values t1, t2, t3 and t4 with the binary numbers “00”, “01”, “10” and “11”; wherein the sampled data are compressed as four binary numbers “00”, “01”, “10” and “11”.

6. A system for replication and learning of a waveform for infrared (IR) remote control of a household appliance, comprising:

a sampling module device, configured to sample a data code from the household appliance infrared remote waveform by a direct sampling method to obtain the sampled data; wherein the sampled data comprises a level type and a level duration, the level type comprises a high level and a low level;

a feature extraction module device connected to the sampling module device, configured to perform a feature extraction to the sampled data to obtain a feature value, wherein the feature value comprising a high level feature value and a low level feature value; each feature value comprising a level value and a level length, wherein the level length is the level duration, and the level value is selected between 1 and 0; and a deburring module device, connected to the feature extraction module device and the sampling module device, configured to reverse the level length which is shorter than a minimum feature value and is within a preset range, and adding the reversed level length with an adjacent levels length of adjacent levels to perform deburring in the household appliance infrared remote waveform, wherein the adjacent levels refer to the levels previous and after the reversed level, and the minimum feature value is a feature value with a minimum level length.

7. The system for replication and learning of the waveform for IR remote control of the household appliance according to claim 6, wherein the feature extraction module device comprises:

a classifying unit device, configured to classify the sampled data with the high level type as high level sampled data; and a first processing unit device connected to the classifying unit device, configured to process the level duration of the sampled high level data;

the first processing unit device comprising:

a first deleting subunit device connected to the classifying unit device, configured to delete a first preset number of the sampled high level data with a longest duration and a second preset number of the sampled high level data with a shortest duration;

a first dividing subunit device connected to the first deleting subunit device and the classifying unit device, and configured to divide a remaining sampled high level data into four groups with a same time interval;

a first feature value extraction subunit device connected to the first dividing subunit device, configured to select a level duration average value of a data group with maximum volume from the four high level sampled data groups as a first feature value t4 of the sampled high level data; and a second feature value extraction subunit device connected to the first dividing subunit device, configured to select a level duration average value of a data group with second largest volume from the four high level sampled data groups as a second feature value t2 of the sampled high level data.

8. The system for replication and learning of the waveform for IR remote control of the household appliance according to claim 7, wherein the feature extraction module device further comprises:

the classifying unit device, configured to classify the sampled data with the low level type as low level sampled data; and a second processing unit device connected to the classifying unit device, configured to process the level duration of the sampled low level data;

the second processing unit device comprising:

a second deleting subunit device connected to the classifying unit device, configured to delete a first preset number of the sampled low level data with a longest duration and a second preset number of the sampled low level data with a shortest duration;

a second classifying subunit device connected to the first deleting subunit device and the classifying unit device, configured to divide a remaining sampled low level data into four groups with a same time interval;

a third feature value extraction subunit device connected to the first classifying subunit device, configured to select a level duration average value of a data group with largest volume from the four low level sampled data groups as a first feature value t3 of the sampled low level data; and a fourth feature value extraction subunit device connected to the first classifying subunit device, configured to select a level duration average value of a data group with second largest volume from the four low level sampled data groups as a second feature value t1 of the sampled low level data.

9. The system for replication and learning of the waveform for IR remote control of the household appliance according to claim 8, further comprising: an encoding module device connected to the feature extraction module device, wherein the encoding module device comprises:

a high level assigning unit device, configured to compare the sampled high level data with the first feature value t4 and the second feature value t2 of the sampled high level data and assign the sampled high level data whose level length is within 50% of the first feature value t4 or the second feature value t2 with a corresponding high level feature value, the corresponding feature value being the first feature value t4 or the second feature value t2;

a low level assigning unit device, configured to compare the sampled low level data with the first feature value t3 and the second feature value t1 of the sampled low level data and assign the sampled low level data whose level length is within 50% of the first feature value t3 or the second feature value t1 with a corresponding low level feature value, the corresponding feature value being the first feature value t3 or the second feature value t1; and a representing unit device, configured to represent the assigned sampled high level data and sampled low level data with four feature values t1, t2, t3, and t4.

10. The system for replication and learning of the waveform for IR remote control of the household appliance according to claim 9, wherein the encoding module device further comprises:

a binary representing unit device connected to the representing unit device, configured to respectively represent the four feature values t1, t2, t3, and t4 with the binary numbers “00”, “01”, “10”, and “11”, so that the sampled data are encoded with the four binary numbers “00”, “01”, “10”, and “11”.

* * * * *